United States Patent [19]

Hayes

[11] Patent Number: 4,935,490

[45] Date of Patent: Jun. 19, 1990

[54] HIGHLY SOLUBLE AROMATIC POLYIMIDES

[75] Inventor: Richard A. Hayes, Hockessin, Del.

[73] Assignee: E. I. DuPont de Nemours and Company, Wilmington, Del.

[21] Appl. No.: 175,502

[22] Filed: Apr. 13, 1988

[51] Int. Cl.$^5$ ............................................. C08G 69/26
[52] U.S. Cl. ...................... 528/353; 528/125; 528/126; 528/128; 528/172; 528/185; 528/352
[58] Field of Search ............ 528/353, 125, 126, 128, 528/172, 185, 352

[56] References Cited

U.S. PATENT DOCUMENTS

| | | | |
|---|---|---|---|
| 3,356,648 | 12/1967 | Rogers | 528/229 |
| 3,423,491 | 1/1969 | McLain et al. | 264/49 |
| 3,546,175 | 12/1970 | Angelo | 528/353 |
| 3,642,682 | 2/1972 | Vincent | 524/104 |
| 3,705,869 | 12/1972 | Darmony et al. | 524/706 |
| 3,705,870 | 12/1972 | Darmony et al. | 524/716 |
| 3,723,306 | 3/1973 | Bridgeford | 210/500.29 |
| 3,758,434 | 9/1973 | Kunzel et al. | 524/104 |
| 3,787,367 | 1/1974 | Farrissey et al. | 524/104 |
| 3,803,075 | 4/1974 | Kray et al. | 524/726 |
| 3,856,752 | 12/1974 | Bateman et al. | 528/299 |
| 3,957,651 | 5/1976 | Kesting | 210/490 |
| 3,959,350 | 5/1976 | Rogers | 528/185 |
| 4,078,142 | 3/1978 | Keske | 560/78 |
| 4,145,522 | 5/1979 | Keske | 528/331 |
| 4,588,804 | 5/1986 | Fryd | 528/125 |
| 4,607,093 | 9/1986 | Sun | 528/322 |
| 4,629,685 | 12/1986 | Pfiefer | 430/583 |
| 4,629,777 | 12/1986 | Pfeifer | 528/353 |
| 4,656,116 | 4/1987 | Rohde et al. | 430/197 |

FOREIGN PATENT DOCUMENTS 2050251 2/1981 France.

OTHER PUBLICATIONS

NASA Technical Memorandum 89016, "Soluble Aromatic Polyimides for Film Coating Applications", St Clair et al, Sep. 1986.

Primary Examiner—Morton Foelak
Assistant Examiner—M. L. Moore

[57] ABSTRACT

Aromatic polyimides of the formula:

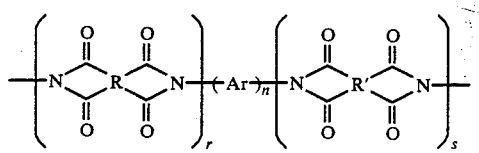

-continued

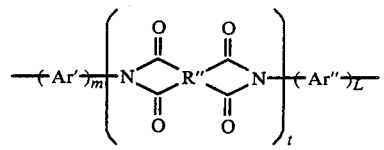

where —Ar— is

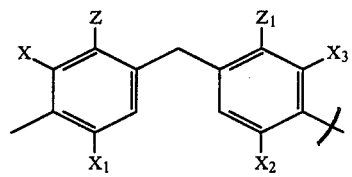

—Ar'— is

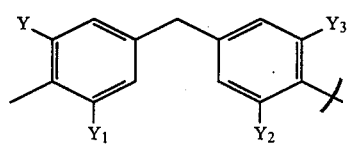

—Ar"— is

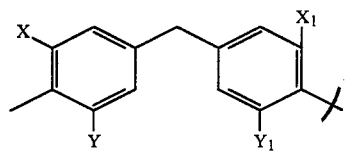

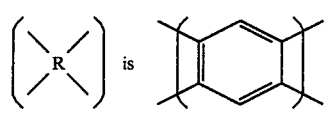

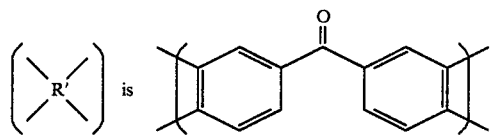

and 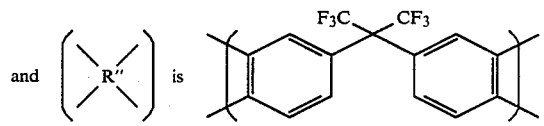

where —Z, and —Z$_1$, independently are —Cl, —Br or —I; where —X, —X$_1$, —X$_2$ and —X$_3$ independently are —CH$_3$ or —C$_2$H$_5$; and —Y,—Y$_1$,—Y$_2$ and —Y$_3$ are primary or secondary alkyl groups having 3 to 12 carbon atoms, provided that when m is greater than 0, r is 0 and that when L is greater than 0, r and s are 0, are disclosed. These polyimides are very soluble, even in weak solvents such as toluene.

7 Claims, No Drawings

HIGHLY SOLUBLE AROMATIC POLYIMIDES

BACKGROUND OF THE INVENTION

1. Field of the Invention

The present invention relates to a class of fully-cyclized aromatic polyimides, typified as containing alkyl substituted aromatic diamines and/or alkyl substituted halide substituted aromatic diamines. These aromatic polyimides are more soluble in weaker solvents such as toluene than other high-temperature aromatic polyimides.

2. Prior Art

U.S. Pat. Nos. 4,629,685; 4,629,777, and 4,656,116 disclose highly alkyl substituted aromatic polyimides some of which are soluble in good aprotic solvents. They do not disclose these polyimides to be soluble in weaker solvents.

U.S. Pat. No. 3,356,648 discloses polyamide acids and polyimides from hexafluoropropylidene bridged diamines and dianhydrides to be soluble in relatively weak solvents such as acetone but not in weaker solvents such as toluene.

U.S. Pat. No. 3,959,350 describes polyimides soluble in good aprotic solvents. Solubility in weaker solvents is not exemplified.

U.S. Pat. No. 3,705,870 describes soluble polyimides prepared from 2,4-diaminodiphenylamines and 2,4-diaminophenyl sulfides. Solubility in weak solvents is not exemplified.

U.S. Pat. No. 3,705,869 describes soluble polyimides derived from 3,3-bis(p-aminophenyl)oxindole and 3,3-bis(p-aminophenyl)-1-phenyl oxindole. Solubility in weak solvents is not disclosed.

U.S. Pat. No. 3,758,434 describes polyimides which are soluble in good, aprotic solvents. Solubility in weaker solvents is not disclosed.

U..S Pat. No. 3,787,367 describes soluble copolyimides. Solubility in weaker solvents is not disclosed.

U.S. Pat. No. 3,803,075 describes soluble polyimides from 2,6-diamino-s-triazines. The materials are insoluble in weak solvents.

U.S. Pat. No. 3,856,752 describes soluble polyimides prepared from phenylindanediamines and dianhydrides. Solubility in weak solvents is not disclosed.

U.S. Pat. Nos. 4,078,142 and 4,145,522 describe polyimide materials which have improved solubility. However, no solubility information was disclosed.

U.S. Pat. No. 3,546,175 describes soluble polyimides from 2,4-diaminoisopropylbenzene and pyromellitic dianhydride and 3,3',4,4'-benzophenonetetracarboxylic dianhydride. These materials were found to only be soluble in good aprotic solvents.

U.S. Pat. No. 3,642,682 describes soluble polyimides from guanamine-based diamines. Weak solvents may be used as diluents or cosolvents with good, aprotic solvents for their materials.

U.S. Pat. No. 4,588,804 describes a series of soluble polyimides. Solubility in weak solvents is not disclosed.

U.S. Pat. No. 4,607,093 describes soluble polyimides. These materials are disclosed not to be soluble in weak solvents.

NASA-TM-89016 describes soluble polyimides. These materials are not disclosed to be soluble in weak solvents.

SUMMARY OF THE INVENTION

The present invention relates to aromatic polyimides which are soluble in weak solvents such as toluene. These polyimides are formed of one or more substituted 4,4'-methylene dianilines, and pyromellitic dianhydride, benzophenonetetracarboxylic dianhydride, or 4,4'-[2,2,2-trifluoro-1-(trifluoromethyl) ethylidene]-bis (1,2-benzene dicarboxylic anhydride).

DETAILED DESCRIPTION

Polyimides, as a class, tend to be insoluble in a wide range of solvents. This insolubility, along with excellent high-temperature properties and high softening temperatures, have made aromatic polyimide materials very difficult to fabricate into many products. The fabrication of films, coatings, and other structures from insoluble aromatic polyimides generally requires elaborate processes. For example films may be formed from the soluble polyamide-acid precursor of an insoluble polyimide. The film, after excess solvent is removed, is thermally and/or chemically treated to dehydrate the precursor film to the polyimide film. There are further problems, such as void formation caused by the evolution of the by-product water during the cure step and the like.

The above-mentioned shortcomings have been circumvented in the art through the development of soluble, fully-cyclized polyimides. The majority of these materials are only soluble in good organic solvents, typically N-methylpyrrolidone, N,N-dimethylacetamide, dimethylformamide, dimethylsulfoxide, dichloromethane, phenolic solvents and the like. Fully-cyclized polyimides which are soluble in much weaker solvents, such as ketone, i.e., acetone, or aromatic hydrocarbons, are rare. In a recent review of soluble polyimides, less than 5% of the examples cited were soluble in acetone (see F. W. Harris, W. A. Feld, and L. H. Lanier, *Am. Chem. Soc., Polymer Preprints,* 17, (1976) pp. 353–358). Fully-cyclized high-temperature polyimides soluble in even weaker solvents than acetone have, heretofore, not been disclosed.

Solubility in weaker solvents offers unique fabrication opportunities not available to insoluble or less soluble polyimides. Weaker solvents tend to have higher volatilities than better solvents, such as N-methylpyrrolidone. Therefore, it requires lower temperatures to form films, coatings, and the like from polyimides soluble in weaker, more volatile solvents than from polyimides which are only soluble in better solvents. Extensive fabrication processes for the manufacture of such polyimide structures can therefore be circumvented.

Polyimides which are soluble in weaker solvents also allow for easier fabrication of multilayer structures. It is difficult to fabricate multilayer structures in which the material of the coating is soluble only in solvents to which the material of the substrate is sensitive. This problem is circumvented by polyimide materials that are soluble in weaker solvents in which the material of the substrate is insensitive. An example of the above can occur in the application of polyimide passivating coatings on electronic devices. Currently, application of said coatings requires solutions of aromatic polyimides, or their polyamide acid precursors, which are soluble only in good solvents, such as N-methylpyrrolidone. However, often components of said electronic devices are sensitive to such good solvents and may be damaged. The problem can be circumvented through the use of aromatic polyimides which are soluble in much weaker solvents which do not damage such components.

The present invention circumvents the above shortcomings and provides a class of high temperature fully-cyclized polyimides which are soluble in weaker solvents. This class represents the first class of polyimide materials which are soluble in such weak solvents represented by toluene. This more soluble class of polyimides is compositionally prepared essentially from ortho-alkyl-substituted aromatic diamines and/or ortho-alkyl-substituted meta-halide-substituted aromatic diamines and aromatic dianhydrides. Suitable polyimide compositions which have enhanced solubility include polyimides with the following repeating units:

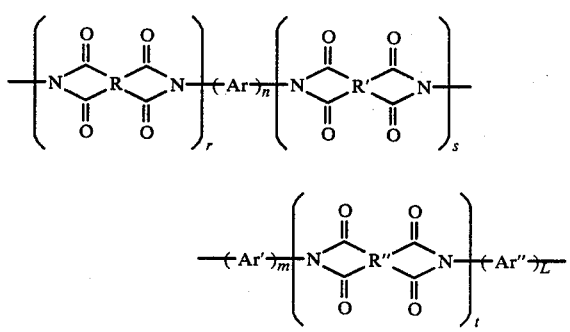

where —Ar— is

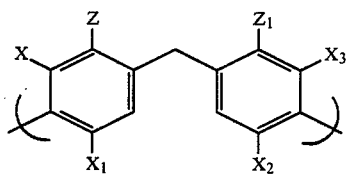

—Ar'— is

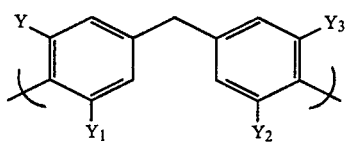

—Ar"— is

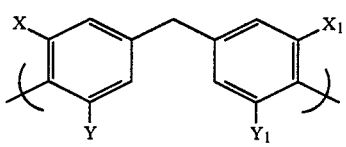

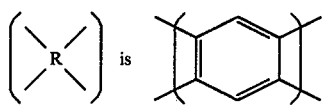

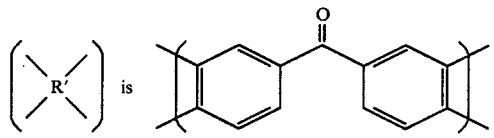

and 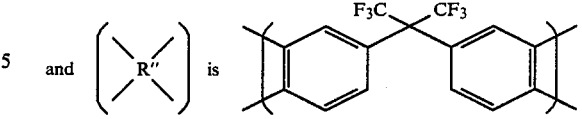

where —Z, and —$Z_1$, independently are —Cl, —Br or —I; where —X, —$X_1$, —$X_2$ and —$X_3$ independently are —$CH_3$ or —$C_2H_5$; and —Y,—$Y_1$, —$Y_2$ and —$Y_3$ are primary or secondary alkyl groups having 3 to 12 carbon atoms, provided that when m is greater than 0, r is 0 and that when L is greater than 0, r and s are 0.

It is believed that the surprisingly enhanced solubility for this class of high temperature aromatic polyimides is a direct result of a combination of structural features incorporated therein.

It is known that some fully-cyclized aromatic polyimides which incorporate 4,4'-[2,2,2-trifluoro-1-(trifluoromethyl)ethylidene]bis(1,2-benzenedicarboxylic acid anhydride) (6FDA) are soluble in good aprotic solvents, such as N-methylpyrrolidone. This solubility is usually attributed to the hexafluoroisopropylidene function incorporated therein. This function serves to separate the imide linkages to prevent ring conjugation within the polyimide chain. This function further serves to disrupt the macromolecular structure of the polyimide chain, thus hindering inter-chain organization. This incorporation of 6FDA into aromatic polyimides is, however, rarely adequate to provide enhanced polymer solubility in weak solvents such as acetone. This incorporation has not been shown to be a sufficient criterion for polyimide solubility in even weaker solvents, such as toluene.

It is known that some fully-cyclized aromatic polyimides which incorporate 3,3',4,4'-benzophenonetetracarboxylic acid anhydride (BTDA) are soluble in good aprotic solvents, such as N-methylpyrrolidone. This incorporation of BTDA into aromatic polyimides has not been shown to be a sufficient criterion to provide enhanced polymer solubility in weak solvents such as acetone or in even weaker solvents such as toluene.

The ortho-alkyl substituents of the diamine function tend to sterically-crowd the imide linkage. This causes the aromatic residue of the diamine function to be held out of the plane of the imide function and the aromatic residue of the dianhydride function. Electronic ring conjugation within the aromatic polyimide chain is, therefore, greatly reduced. Further, the before-mentioned alkyl substituents sterically block strong electronic interactions between different polyimide chains within a film and/or coating. However, as taught in the prior art, the incorporation of ortho-alkyl substituents is not, by itself, a sufficient criterion to provide enhanced polymer solubility in weak solvents such as acetone or in even weaker solvents such as toluene.

The combination of the above-mentioned structural features serves to greatly reduce inter-chain and intra-chain interactions. It is believed that it is this reduction which serves to give the surprisingly high solubilities of this class of high temperature, aromatic polyimides. Regardless of the mechanism, the finding that the class of aromatic polyimides described in this invention have greatly enhanced solubilities in very weak solvents is surprising in light of the teachings of the prior art.

These highly soluble, high temperature polyimides are easily fabricated into films, coatings and other structures. The fully cyclized polyimides described herein are dissolved in very weak solvents, such as toluene, cast into films and the like, and rapidly dry to form the finished product. As discussed before, such ease in forming these products from polyimide solutions in very weak solvents is unprecedented in the art.

EXAMPLES

Example 1

To a stirred solution of 4,4'-methylene-bis(3-chloro-2,6-diethyl aniline)(37.9 g, 0.20 mol) in N-methylpyrrolidone (250 ml) was added 4,4'-[2,2,2-trifluoro-1-(trifluoromethyl) ethylidene]-bis(1,2-benzenedicarboxylic acid anhydride) (6FDA, 44.8 g, 0.101 mol, last portion washed in with an additional 50 ml N-methylpyrrolidone) under an inert atmosphere at room temperature. The slightly orange solution was stirred overnight at room temperature. A solution of acetic anhydride (37.7 ml, 0.4 mol), triethylamine (55.6 ml, 0.4 mol) and N-methylpyrrolidone (300 ml) was added with rapid stirring at room temperature. After stirring for 4 hours at room temperature, the reaction solution was precipitated in water. The resulting solid was washed with water and methanol. The polymer was air-dried overnight and then dried in a vacuum oven (20 inches mercury) at 120° C. for 3 hours and at 250° C. for 5 hours to yield 64.1 g product.

This polyimide is soluble at greater than 20% solids (based on polymer weight) in toluene, acetone, dichloromethane, N-methylpyrrolidone, dimethylacetamide, and meta-cresol.

Differential Scanning Calorimetry (DSC) was performed on the above polymer using a Du Pont Thermal Analyzer Model 990-3 with cell model HC81-5/N00523, Baseline slope =5.0 in a nitrogen atmosphere at a 10° C./minute progress rate. No transitions correlatable to a Tg were observed up to 400° C. by this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 440° C. and a 40% weight loss was observed at 560° C.

EXAMPLE 2

To a stirred solution of 4,4'-methylene-bis(3-chloro-2,6-diethyl aniline) (189.7 g, 0.501 mol) in N-methylpyrrolidone (1,000 ml) was added 4,4'-[2,2,2-trifluoro-1-(trifluoromethyl)ethylidene]-bis(1,2-benzenedicarboxylic acid anhydride) (6FDA, 224.5 g, 0.505 mol, last portion washed in with an additional 250 ml N-methyl pyrrolidone) at room temperature with a slight nitrogen purge. The reaction solution was slowly heated to boiling while allowing the distillates to collect. After 325 ml of distillates had been collected, the remaining distillates were allowed to flow back into the reaction solution. After heating at 203° C. for 8 hours, the reaction solution was allowed to cool to room temperature. The solution was diluted with additional N-methylpyrrolidone and precipitated in water. The resulting polymer was washed with water and methanol. The off-white solid was air-dried overnight and dried in a vacuum oven (20 inches mercury) at 120° C. for 3 hours and at 250° C. for 5 hours to yield 378.1 g product.

This polyimide is soluble at greater than 20% solids (based on polymer weight) in toluene, acetone, dichloromethane, N-methylpyrrolidone, dimethylacetamide and meta-cresol.

Films of the polyimide prepared above were cast from a 15% polymer solution (based on weight) in toluene onto a glass plate treated with TEFLON® dry lubricant at room temperature with a 15-mil ($38.4 \times 10^{-5}$ m) knife gap. TEFLON® dry lubricant contains a fluorocarbon telomer which reduces the adhesion of the film to the glass plate. The films were tackless in less than 30 minutes. After drying on the plate at room temperature for 30 minutes, the films were further dried in a vacuum oven (20 inches mercury) at room temperature overnight. The films were stripped off the plate. The clear films were tough and flexible and could be creased without cracking.

Comparison of Example 1 with Example 2 demonstrates that the exceptional solubility range found for the class of polyimides of this invention is independent of how the polyimide was prepared.

COMPARATIVE EXAMPLE 1

To a stirred solution of 4,4'-methylene-bis(2,6-diethylaniline) (31.0 g, 0.10 mol) in N-methylpyrrolidone (250 ml) was added 4,4'-[2,2,2-trifluoro-1-(trifluoromethyl)-ethylidene]-bis(1,2-benzenedicarboxylic acid anhydride) (6FDA, 44.8 g, 0.101 mol, last portion washed in with an additional 50 ml N-methylpyrrolidone) under an inert atmosphere at room temperature. The slightly orange colored solution was allowed to stir overnight at room temperature. A solution of acetic anhydride (37.7 ml, 0.4 mol), triethylamine (55.6 ml, 0.4 mol) and N-methylpyrrolidone (200 ml) was added with rapid stirring at room temperature. After stirring for 8 hours at room temperature, the reaction solution gelled. The mixture was precipitated in water and washed successively with water and methanol. The resulting off-white solid was air-dried overnight and dried in a vacuum oven (20 inches mercury) at 120° C. for 3 hours and at 250° C. for 5 hours to yield 55.6 g product.

The polyimide was found to be insoluble in toluene, acetone, dichloromethane, dimethylsulfoxide, N-methylpyrrolidone, meta-cresol and dimethylacetamide.

Comparative Example 1 demonstrates that the combination of structural features of 6FDA and ortho-alkyl substituents of the diamine function are not necessarily sufficient to provide the surprising polyimide solubility range of this invention. The difference between Comparative Example 1 and Examples 1 and 2 is the halide substituent incorporated into the diamine function. It is believed that this halide substituent causes disymmetry in the polyimide which disrupts the packing of polyimide chains and serves to block strong interactions between polyimide chains, as discussed before. Regardless of the mechanism, the finding that the class of aromatic polyimides described in this invention has greatly enhanced solubilities in very weak solvents is surprising in light of the teachings of the prior art.

COMPARATIVE EXAMPLE 2

To a stirred solution of 4,4'-methylene-bis(2-ethyl-6-methylaniline) (28.2 g, 0.10 mol) in N-methyl pyrrolidone (250 ml) was added 4,4'-[2,2,2-trifluoro-1(trifluoromethyl)ethylidene]-bis(1,2-benzenedicarboxylic acid anhydride) (6FDA, 44.8 g, 0.101 mol, last portion washed in with an additional 50 ml N-methylpyrrolidone) under an inert atmosphere at room temperature. The slightly yellow solution was allowed to stir overnight at room temperature. A solution of acetic anhydride (37.7 ml, 0.4 mol), triethylamine (55.6 mol, 0.4 mol) and N-methylpyrrolidone (300 ml) was added with rapid stirring at room temperature. After stirring for 4 hours at room temperature, the reaction solution was precipitated in water. The resulting slightly yellow product was washed with water and methanol. The polymer was air-dried overnight and then dried in a vacuum oven (20 inches mercury) at 120° C. for 3 hours and at 250° C. for 5 hours to yield 61.6 g product.

This polyimide is soluble in N-methylpyrrolidone, dimethylacetamide, dichloromethane, and meta-cresol but insoluble in acetone and toluene.

Comparative Example 2 demonstrates that disymmetry promoted by the use of different ortho-alkyl substituents on the diamine function allows a greater polyimide solubility range than found when the ortho-alkyl substituents are the same (e.g. Comparative Example 1) but is not necessarily a sufficient criterion for the surprisingly wide range of polyimide solubilities found in the present invention.

EXAMPLE 3

A stirred solution of 4,4'-methylene-bis(2-isopropyl-6-methylaniline) (155.0 g, 0.50 mol) and 4,4'-[2,2,2-trifluoro-1-(trifluoromethyl)ethylidene]bis(1,2-benzenedicarboxylic acid anhydride) (224.22 g, 0.505 mol) in N-methyl pyrrolidone (1250 ml) was slowly heated to boiling with a slight nitrogen purge while allowing the distillates to collect. After 249 ml of distillates had been collected, the remaining distillates were allowed to flow back into the reaction solution. After heating at 203° C. for 6 hours, the viscous reaction solution was allowed to cool to room temperature. The solution was diluted with additional N-methylpyrrolidone and precipitated in water. The resulting solid was washed with water and methanol. The solid was air-dried overnight and dried in a vacuum oven (20 inches mercury) at 120° C. for 3 hours and at 250° C. for 5 hours.

This polyimide is soluble in toluene, acetone, dichloromethane, N-methylpyrrolidone, dimethylacetamide and meta-cresol.

Differential Scanning Calorimetry (DSC) was performed on the above polymer using a Du Pont Thermal Analyzer Model 990-3 with cell model HCB1-5/N00523, Baseline slope=5.0 in a nitrogen atmosphere at a 10° C./minute progress rate. No transitions correlatable to a Tg were observed up to 400° C. by this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 410° C. and a 40% weight loss was observed at 520° C.

Example 3 demonstrates that the greater disymmetry promoted by the use of significantly different ortho-alkyl substituents on the diamine function does allow for the surprisingly wide range of polyimide solubilities found in the present invention as described before.

EXAMPLE 4

A stirred solution of 4,4'-methylene-bis(2,6-diisopropyl aniline) (183 g, 0.5 mol) and 4,4'-[2,2,2-trifluoro-1-(trifluoromethyl)ethylidene]bis(1,2-benzenedicarboxylic acid anhydride) (224.22 g, 0.505 mol) in N-methylpyrrolidone (1250 ml) was slowly heated to boiling with a slight nitrogen purge while allowing the distillates to collect. After 249 ml of distillates had been collected, the remaining distillates were allowed to flow back into the reaction solution. After heating at 202° C. for 3 hours, the viscous reaction solution was allowed to cool to room temperature. The solution was diluted with additional N-methylpyrrolidone and precipitated in water. The resulting solid was washed twice with water and methanol. The solid was air dried overnight and dried in a vacuum oven (20 inches mercury) at 120° C. for 3 h and at 250° C. for 5 h to give 368.3 g product.

This polyimide is soluble in toluene, acetone, dichloromethane, N-methylpyrrolidone, dimethylacetamide and meta-cresol.

Differential Scanning Calorimetry (DSC) was performed on the above polymer using a Du Pont Thermal Analyzer Model 990-3 with cell model HCB1-5/N00523, Baseline slope=5.0 in a nitrogen atmosphere at a 10° C./minute progress rate. No transitions correlatable to a Tg were observed up to 400° C. by this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 400° C. and a 40% weight loss was observed at 530° C.

Example 4 demonstrates that the incorporation of large, bulky ortho-alkyl substituents in the diamine function promotes the exceptional polyimide solubility range of this invention. It is believed that these large, bulky ortho-alkyl substituents cause disymmetry in the polyimide which disrupts the packing of polyimide chains and serves to block strong interactions between polyimide chains, as discussed before. Alternatively, these structurally large ortho-alkyl substituents may chemically mask the imide function and serve to block strong interactions between polyimide chains. Such a mechanism may also be operative for Example 3. The difference between Comparative Example 1 and Example 4 may be due to the greater structural bulk of the ortho-isopropyl substituent of the diamine function in Example 4 than the ortho-ethyl substituent found in Comparative Example 1. Regardless of the mechanism, the finding that the class of aromatic polyimides described in this invention have greatly enhanced solubilities in very weak solvents is surprising in light of the teachings of the prior art.

EXAMPLE 5

A stirred solution of 4,4'-methylene-bis(3-chloro-2,6-diethyl aniline) (113.81 g, 0.30 mol) and 1,2,4,5-benzene tetracarboxylic acid anhydride (66.10 g, 0.303 mol) in N-methylpyrrolidone (650 ml) was slowly heated to boiling with a slight nitrogen purge while allowing the distillates to collect. After 11 ml of distillates had been collected, the remaining distillates were allowed to flow back into the reaction solution. After heating at 201° C. for 8 hours, the viscous reaction solution was allowed to cool to room temperature. The solution was diluted with additional N-methylpyrrolidone and precipitated in water. The resulting solid was washed twice with water and twice with methanol. The solid was air-dried overnight and dried in a vacuum oven (20 inches mercury) at 120° C. for 3 hours and at 250° C. for 5 hours to yield 157.5 g product.

This polyimide is soluble in toluene, dichloromethane, meta-cresol, dimethylacetamide and N-methylpyrrolidone.

Differential Scanning Calorimetry (DSC) was performed on the above polymer using a Du Pont Thermal Analyzer Model 990-3 with cell model HCB1-5/N00523, Baseline slope=5.0 in a nitrogen atmosphere at a 10° C./minute progress rate. No transitions correlatable to a Tg were observed up to 400 C. by this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 420° C. and a 40% weight loss was observed at 455° C.

Example 5 demonstrates that it is not necessary to incorporate the structural features found in 6FDA to have the exceptional solubility range found for the polyimides of this invention. Polyimides prepared from 1,2,4,5-benzenetetracarboxylic acid anhydride (PMDA) have generally been found in the prior art to be insoluble. Only in rare cases, as taught in the prior art, have they been found to be soluble in even the best solvents. It is believed that the halide substituent incorporated into the diamine function causes disymmetry in the polyimide which disrupts the packing of polyimide chains and serves to block strong interactions between polyimide chains, as discussed before. Regardless of the mechanism, the finding that the class of aromatic polyimides described in this invention have greatly enhanced solubilities in very weak solvents is surprising in light of the teachings of the prior art.

EXAMPLE 6

A stirred solution of 4,4,-methylene-bis(3-chloro-2,6-diethylaniline) (189.45 g,, 0.5 mol), 3,3',4,4'-benzophenonetetracarboxlyic acid anhydride (162.73 g, 0.505 mol), and N-methylpyrrolidone (1100 ml) was slowly heated to boiling with a slight nitrogen purge while allowing the distillates to collect. After 220 ml of distillates had been collected, the remaining distillates were allowed to flow back into the reaction solution. After heating at 204° C for 6 hours, the viscous reaction solution was allowed to cool to room temperature. The solution was diluted with additional N-methylpyrrolidone and precipitated in water. The resulting solid was washed with water and methanol. The solid was air-dried overnight and dried in a vacuum oven (20 inches mercury) at 120° C. for 3 h and at 250° C. for 5 h to yield 332.6 g product.

This polyimide is soluble in toluene, dichloromethane, meta-cresol, dimethylsulfoxide, dimethylacetamide, and N-methylpyrrolidone.

Differential Scanning Calorimetry (DSC) was performed on the above polymer using a Du Pont Thermal Analyzer Model 990-3 with cell model HC81-5/N00523, Baseline slope=5.0 in a nitrogen atmosphere at a 10° C./minute progress rate. No transitions correlatable to a Tg were observed up to 400° C. by this method.

Thermogravimetric Analysis (TGA) was performed on the above polymer using a Du Pont Thermogravimetric Analyzer Model 99-2 with a cell Model 951-5 in an air atmosphere at a 10°C./minute progress rate. A 5% weight loss was observed at 425° C. and a 40% weight loss was observed at 530° C.

Comparison of Example 1 and Example 4 demonstrates it is not necessary to incorporate the structural features found in 6FDA to have the exceptional solubility range found for the polyimides of this invention. It is believed that the large, bulky ortho-alkyl substituents cause disymmetry in the polyimide which disrupts the packing of polyimide chains and serves to block strong interactions between polyimide chains, as discussed before. Alternatively, these structurally large ortho-alkyl substituents may chemically mask the imide function and serve to block strong interactions between polyimide chains. Regardless of the mechanism, the finding that the class of aromatic polyimides described in this invention have greatly enhanced solutilities in very weak solvents is surprising in light of the teachings of the prior art.

What is claimed:

1. A film forming highly soluble aromatic polyimide consisting essentially of repeating units of the formula

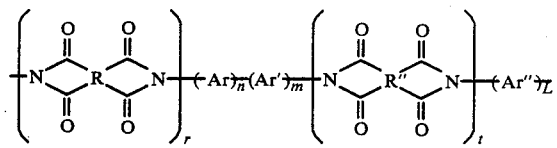

where —Ar— is

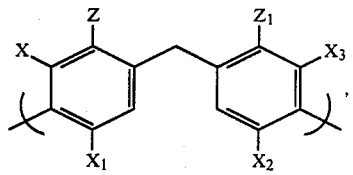

—Ar'— is

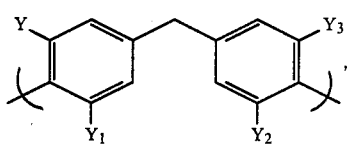

—Ar"— is

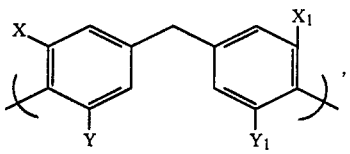

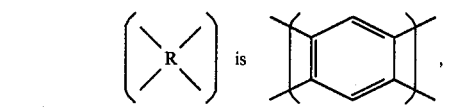

and 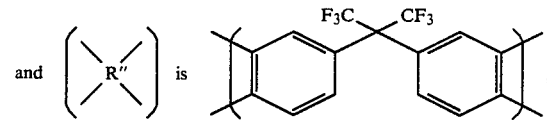

where —Z, and —$Z_1$, independently are —Cl, —Br or —I; where —X, —$X_1$, —$X_2$ and —$X_3$ independently are —$CH_3$ or —$C_2H_5$; and —Y, —$Y_1$, —$Y_2$, and —$Y_3$ are primary or secondary alkyl groups having 3 to 12 carbon atoms, when m is greater than 0, r is 0 and when L is greater than 0, r is 0.

2. The polyimide of claim 1 wherein m and L are 0.
3. The polyimide of claim 2 wherein —Z and —$Z_1$ are —Cl.
4. The polyimide of claim 3 wherein t is 0.
5. The polyimide of claim 3 wherein r is 0.
6. The polyimide of claim 1 wherein 100% of n and L are 0.
7. The polyimide of claim 1 wherein r is 0 and n and m are 0.

* * * * *